United States Patent
Vs et al.

(10) Patent No.: US 11,397,576 B2
(45) Date of Patent: Jul. 26, 2022

(54) DECOMPOSING A MONOLITHIC APPLICATION INTO ONE OR MORE MICRO SERVICES

(71) Applicant: HCL TECHNOLOGIES LIMITED, New Delhi (IN)

(72) Inventors: Maheswari Vs, Chennai (IN); Shrwan Kumar, Noida (IN); Hareendran Madhavan Pillai, Chennai (IN)

(73) Assignee: HCL TECHNOLOGIES LIMITED, New Delhi (IN)

( * ) Notice: Subject to any disclaimer, the term of this patent is extended or adjusted under 35 U.S.C. 154(b) by 0 days.

(21) Appl. No.: 17/203,149

(22) Filed: Mar. 16, 2021

(65) Prior Publication Data

US 2021/0294601 A1    Sep. 23, 2021

(30) Foreign Application Priority Data

Mar. 18, 2020    (IN) .............................. 202011011773

(51) Int. Cl.
*G06F 8/76*    (2018.01)
*G06Q 40/00*    (2012.01)
*G06F 8/75*    (2018.01)

(52) U.S. Cl.
CPC .................. *G06F 8/76* (2013.01); *G06F 8/75* (2013.01); *G06Q 40/12* (2013.12)

(58) Field of Classification Search
CPC ............. G06F 8/76; G06F 8/75; G06Q 40/12
See application file for complete search history.

(56) References Cited

U.S. PATENT DOCUMENTS

| | | | |
|---|---|---|---|
| 10,169,035 B1* | 1/2019 | Caspi | G06F 8/75 |
| 10,430,250 B2* | 10/2019 | Ishikawa | G06F 9/44505 |
| 10,511,690 B1 | 12/2019 | Chatterjee | |
| 10,809,987 B2* | 10/2020 | Alex | G06F 8/433 |
| 2016/0124742 A1* | 5/2016 | Rangasamy | H04L 41/0803 717/103 |
| 2020/0007613 A1 | 1/2020 | Vyas et al. | |
| 2020/0259715 A1* | 8/2020 | Schermann | H04L 67/16 |
| 2020/0285451 A1* | 9/2020 | Agarwal | G06F 8/36 |
| 2021/0232390 A1* | 7/2021 | Hwang | H04L 41/16 |
| 2021/0263735 A1* | 8/2021 | Harishankar | G06F 8/36 |

FOREIGN PATENT DOCUMENTS

| | | |
|---|---|---|
| CN | 105162884 A | 12/2015 |
| CN | 110602052 A | 12/2020 |
| WO | 2017067230 A1 | 4/2017 |

* cited by examiner

*Primary Examiner* — Wei Y Zhen
*Assistant Examiner* — Amir Soltanzadeh
(74) *Attorney, Agent, or Firm* — Kendal Sheets (57) ABSTRACT

The present disclosure relates to system(s) and method(s) for decomposing a monolithic application into one or more micro services. The method identifies a subset of functionalities, from a set of functionalities associated with the monolithic application. The method further determines a number of micro services based on a functionality priority, a functionality complexity score, and a functionality predefined complexity score associated with each functionality. Further, the method generates one or more groups of methods from a plurality of methods associated with the subset of functionalities. Further, the method decomposes the monolithic application into the one or more micro services based on the one or more groups of methods, and the number of micro services.

12 Claims, 4 Drawing Sheets

DECOMPOSING A MONOLITHIC APPLICATION INTO ONE OR MORE MICRO SERVICES

CROSS-REFERENCE TO RELATED APPLICATIONS AND PRIORITY

The present application claims benefit from Indian Patent Application No. 202011011773 filed on 18 Mar. 2020 the entirety of which is hereby incorporated by reference.

TECHNICAL FIELD

The present disclosure in general relates to the field of converting a monolithic application into micro services. More particularly, the present invention relates to a system and method for decomposing the monolithic application into one or more micro services.

BACKGROUND

Monolithic application has every component like an authentication, a presentation, a Business logic, a database layer, an application integration and a notification module. All these components are in a single place tightly integrated to each other. Thus, it is very hard to decouple the monolithic application and define it boundary. Currently, the process of conversion of the monolithic application to a micro service is manual. Also, there is no reference architecture and guideline available that can be used for the conversion process. Hence, lot of issues and changes occurs during the conversion process. The architectural challenge includes deciding what capability to decouple when and how to migrate incrementally.

Further, it is difficult to get the understanding of complete flow of the monolithic application. Identification of the boundary of each components is a trouble as each layer are tightly couple and crossing each other. Also, there is no single standard coding style or standard. Further, there could be multiple dimensions and though process to reach to the number of micro services as result number of micro service could be very high or low. Based on this, it seems that the currently available process of conversion is time consuming and difficult.

SUMMARY

Before the present systems and methods for decomposing a monolithic application into one or more micro services, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for decomposing the monolithic application into the one or more micro services. This summary is not intended to identify essential features of the claimed subject matter nor is it intended for use in determining or limiting the scope of the claimed subject matter.

In one implementation, a method for decomposing a monolithic application into one or more micro services is illustrated. The method may comprise identifying a subset of functionalities, from a set of functionalities associated with the monolithic application. The subset of functionalities may be identified based on a cost benefit analysis of each functionality from the set of functionalities. Further, the method may comprise determining a number of micro services based on a functionality priority, a functionality complexity score, and a functionality predefined complexity score associated with each functionality from the subset of functionalities. Furthermore, the method may comprise generating one or more groups of methods from a plurality of methods associated with the subset of functionalities. The one or more groups of methods may be generated based on an analysis of a dependency of each functionality from the subset of functionalities, an occurrence percentage of each method, and a weightage of each method from the plurality of methods. The method may further comprise decomposing the monolithic application into the one or more micro services based on the one or more groups of methods, and the number of micro services.

In another implementation, a system for decomposing a monolithic application into one or more micro services is illustrated. The system comprises a memory and a processor coupled to the memory, further the processor is configured to execute instructions stored in the memory. In one embodiment, the processor may execute instructions stored in the memory for identifying a subset of functionalities, from a set of functionalities associated with the monolithic application. The subset of functionalities may be identified based on a cost benefit analysis of each functionality from the set of functionalities. Further, the processor may execute instructions stored in the memory for determining a number of micro services based on a functionality priority, a functionality complexity score, and a functionality predefined complexity score associated with each functionality from the subset of functionalities. Furthermore, the processor may execute instructions stored in the memory for generating one or more groups of methods from a plurality of methods associated with the subset of functionalities. The one or more groups of methods may be generated based on an analysis of a dependency of each functionality from the subset of functionalities, an occurrence percentage of each method, and a weightage of each method from the plurality of methods. The processor may further execute instructions stored in the memory for decomposing the monolithic application into the one or more micro services based on the one or more group of methods, and the number of micro services.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for decomposing a monolithic application into one or more micro services are now described. The disclosed embodiments of the system and method for decomposing the monolithic application into the one or more micro services are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for decomposing a monolithic application into one or more micro services is not intended to be limited to the embodiments illustrated, but is to be accorded the widest scope consistent with the principles and features described herein.

In one embodiment, a method for decomposing a monolithic application into one or more micro services is disclosed. In the embodiment, a subset of functionalities, from a set of functionalities associated with a monolithic application, may be identified. The subset of functionalities may be identified based on a cost benefit analysis of each functionality from the set of functionalities. Further, a number of micro services may be determined based on a functionality priority, a functionality complexity score, and a functionality predefined complexity score associated with each functionality from the subset of functionalities. Upon determining the number of micro services, the one or more groups of methods, from a plurality of methods associated with the subset of functionalities, may be generated. Based on the one or more groups of methods and the number of micro services, the monolithic application may be converted into the one or more micro services.

Figure 1:
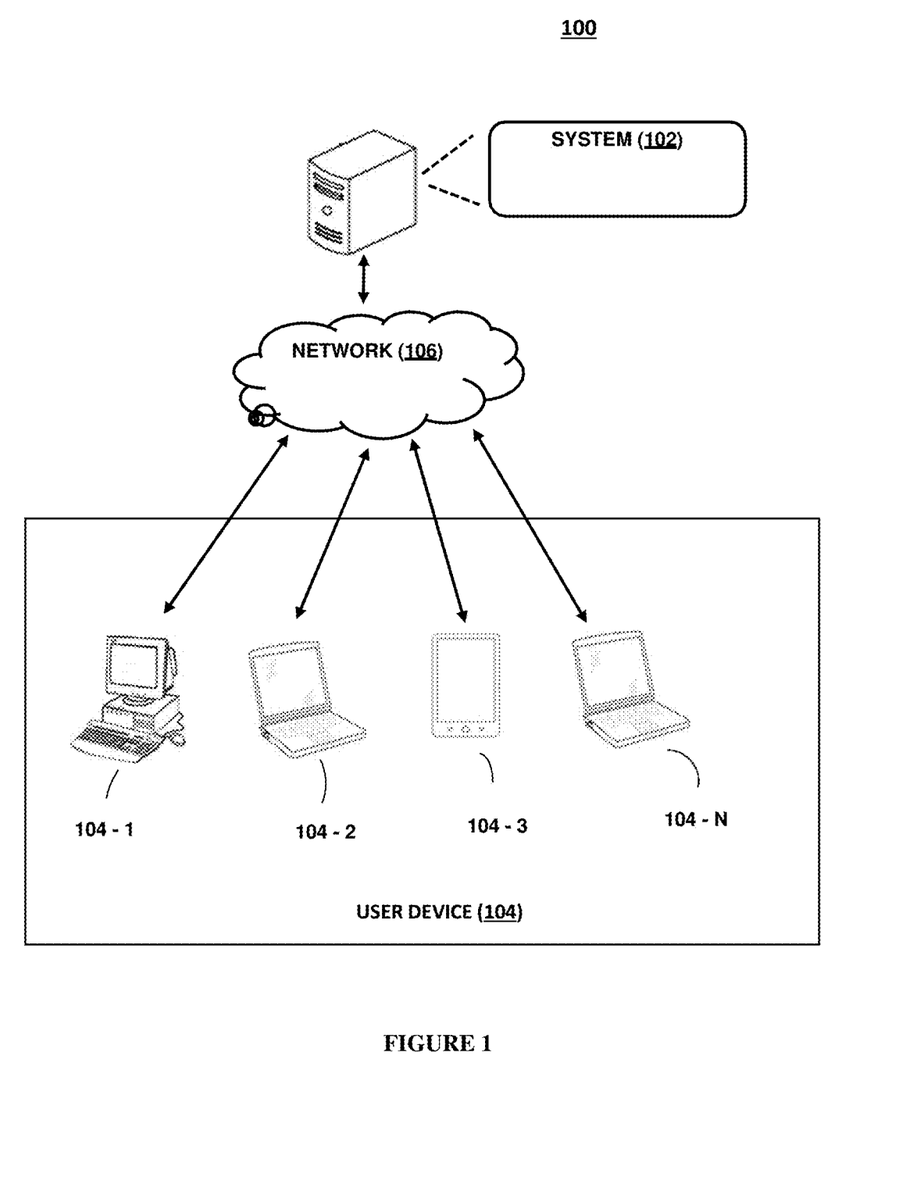
FIG. 1 illustrates a network implementation of a system for decomposing a monolithic application into one or more micro services, in accordance with an embodiment of the present subject matter.

Referring now to FIG. 1, a network implementation 100 of a system 102 for decomposing a monolithic application into one or more micro services is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
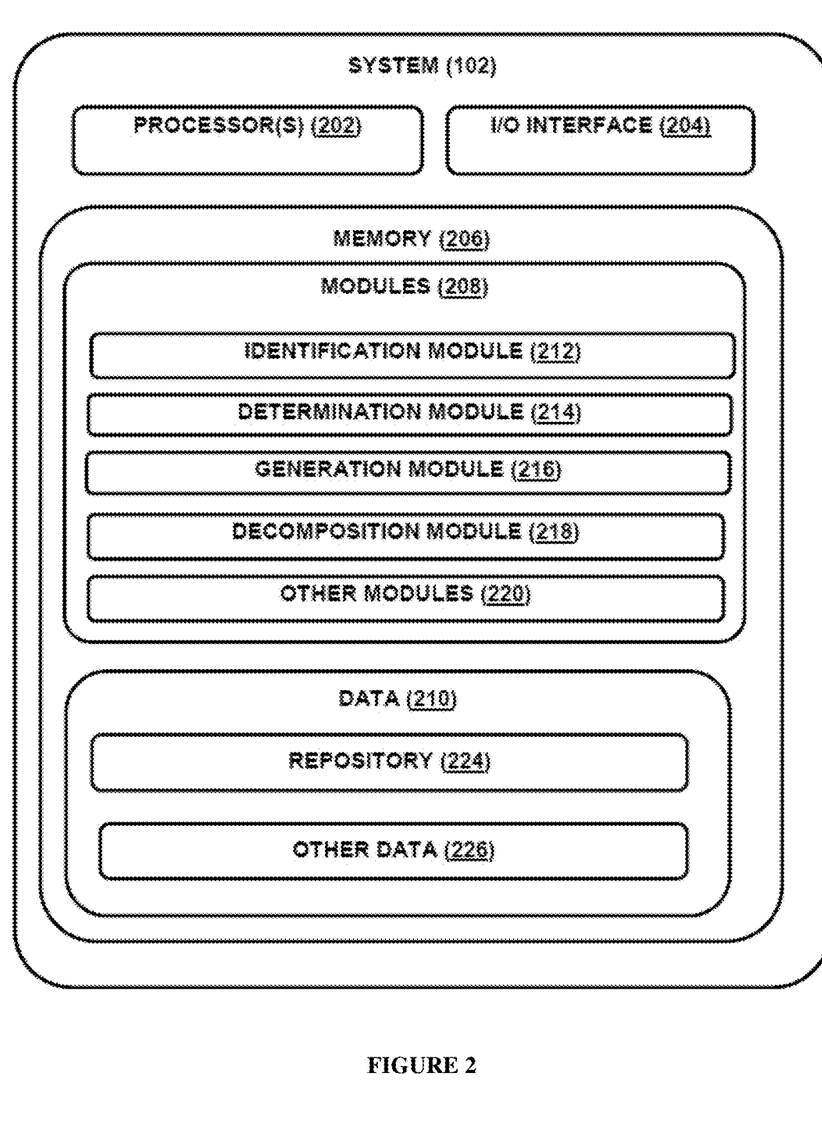
FIG. 2 illustrates the system for decomposing the monolithic application into the one or more micro services, in accordance with an embodiment of the present subject matter.

Referring now to FIG. 2, the system 102 for decomposing a monolithic application into one or more micro services is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include an identification module 212, a determination module 214, a generation module 216, a decomposition module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 224, and other data 226. In one embodiment, the other data 226 may include data generated as a result of the execution of one or more modules in the other modules 222.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the identification module 212 may analyse the monolithic application. Based on the analysis, the identification module 212 may identify a set of functionalities associated with the monolithic application. Further, the identification module 212 may analyse each functionality from the set of functionalities based on a cost benefit analysis. The cost benefit analysis may comprise an analysis of each functionality using parameters one of a functionality usage count, a functionality business criticality, a functionality expected life and the like. Upon performing the cost benefit analysis, the identification module 212 may identify a subset of functionalities from the set of functionalities. In one aspect, the subset of functionalities may correspond to potential functionalities that can be considered to convert the monolithic application into one or more micro services.

In one embodiment, in the cost benefit analysis, the functionality usage count, the functionality business criticality, and the functionality expected life, these parameters may be evaluated against a cost restructuring of the functionality.

In one embodiment, the Table 1 illustrates the evaluation of the parameters and a cost benefit percentage. In one example, F1, F2, F3, F4, and F5 may correspond to functionalities from the set of functionalities. Further, the usage count, the business criticality, and the expected life of each functionality may be evaluated against the cost of restricting of the functionality. Based on the evaluation, a cost benefit score may be determined. The Cost benefit score of a functionality may be calculated combining the parameters like the Usage Count, the Business Criticality and the Expected Life along with their weightage against the cost of effort required for decomposition of the functionality.

TABLE 1

Cost Benefit Analysis

| Functionality | Usage Count | Business criticality | Expected Life (years) | Approx. Restructuring cost (K) | Cost Benefit Score |
|---|---|---|---|---|---|
| F1 | 50% | 40% | 10 | 5 | 40% |
| F2 | 30% | 40% | 10 | 7 | 17% |
| F3 | 10% | 5% | 10 | 1 | 5% |
| F4 | 5% | 5% | 10 | 2 | 1% |
| F5 | 5% | 10% | 10 | 1 | 5% |

Upon performing the cost benefit analysis, the identification module may determine a functionality priority for each functionality from the subset of functionalities. The functionality priority may be determined based on the cost benefit score. If the cost benefit score, of a functionality, is less than a predefined threshold score, then the functionality may have a low functionality priority. Further, if cost benefit score, of a functionality, is greater than the predefined threshold score, then the functionality may have a high functionality priority. The functionalities having the high functionality priority may be further used for the analysis. The functionalities having the low functionality priority may be excluded from the further analysis. In one aspect, a table indicating the subset of functionalities along with the functionality priority may be generated.

In the example as shown in the Table, construe the predefined threshold score as 15%. In this case, the functionalities F1 and F2 may have same priority, and these functionalities may be considered for further analysis. Further, functionalities F3, F4 and F5 may not be considered for further analysis.

Further, the determination module 214 may determine a number of micro services. The number of micro services may be determined based on performing complexity analysis of each functionality having the high functionality probability. The complexity analysis corresponds to analysis based on the functionality priority, a functionality complexity score, and a functionality predefined complexity score associated with each functionality having the high functionality probability.

In one embodiment, the functionality complexity score may be determined based on one or more parameters. The one or more parameter may comprise a response time analysis, a CPU utilization analysis, a code sizing analysis, a cyclomatic complexity analysis, a cognitive complexity analysis, an external dependency analysis, and a DB dependency analysis. In one aspect, each of the parameter may comprise a weightage Pw defined based on a nature and a business context of the parameter. Further, for each of the parameter, each functionally, having the high functionality probability, may be evaluated to compute a parameter specific score Ps. The parameter specific score may also be referred as a complexity value.

Further, the functionality complexity score may be a sum of the weightage multiplied by corresponding parameter specific score. The functionality complexity score may be indicated as Cs(f). Further, the weightage may be indicated as Pw(f), and the parameter specific score may be referred as Ps(f). Further, equation 1 may be used to compute the functionality complexity score.

$$Cs(f) = \text{Sum}(Piw(f) * Pis(f)) \qquad \text{Equation 1}$$

wherein, i varies from 1 to n,
Piw(f)—weightage,
Pis(f)—parameter specific score or complexity value
In one aspect, Table 2 may show the computation of the functionality complexity score.

TABLE 2

Complexity Score for the Functionality

| Parameters | Weightage | Complexity Value | Complexity score |
|---|---|---|---|
| P1: Response Time Analysis | P1w | P1s | P1w × P1s |
| P2: CPU Utilization Analysis | P2w | P2s | P2w × P2s |
| P3: Code Sizing Analysis | P3w | P3s | P3w × P3s |
| P4: Cyclomatic Complexity Analysis | P4w | P4s | P4w × P4s |
| P5 Cognitive Complexity Analysis | P5w | P5s | P5w × P5s |
| P6: External Dependency Analysis | P6w | P6s | P6w × P6s |
| P7: DB Dependency Analysis | P5w | P5s | P5w × P5s |
| Complexity score of Functionality Cs(f) | | | Sum(Piw × Pis) |

Further, the functionality complexity score may be used to determine the number of micro services. The functionality predefined complexity score Cs(M) may be predefined. The number of micro services MSn(f) may be determined based on the functionality complexity score Cs(f) and the functionality predefined complexity score Cs(M). The number of micro services may be a division of the functionality complexity score and the functionality predefine complexity score. In one aspect, the number of micro services may be determined using equation 2.

$$MSn(f)=Cs(f)/Cs(M) \quad \text{Equation 2}$$

In one embodiment, if a value of MSn(f) is 1, then the functionality f, may be an ideal micro-service. Further, if the value of MSn(f) is near to 1 and in a defined acceptance range, then the function may be considered as a micro service. In one example, the value of MSn(f) may be between 0.7 to 1.3. The functionality 'f' may be considered a micro-service if the acceptance range is defined as 0.3.

In one example, the value of MSn(f) for a function f may be 1.2. It may indicate that the complexity score of function $f$ is above that of the ideal Micro service. In this case, it may not be needed to split into 2 micro services, because the deviation 0.2 is within the defined acceptable deviation range, which is 0.3.

In another example, the value of MSn(f) for a function f may be 0.85. It may indicate that the complexity score of function $f$ is below that of the ideal Micro service. In this case, it may be considered as a single micro service because the deviation 0.15 is within the defined acceptable deviation range, which is 0.3.

Furthermore, if the value of MSn(f) is above 1, and above the acceptance range, then the functionality may be divided into many micro services. In one example, if MSn(f)=1.5, it can convert to more than 1 micro services. In another example, if MSn(f)=4.3, it can be converted to 4 microservices. Furthermore, if the value of MSn(f) is less than 1 and below the acceptance range, the functionality may need not be an independent micro service, but the functionality may be associated with other functionalities to form microservice.

Upon determining the number of micro services, the generation module 216 may generate one or more groups of methods from the plurality of methods. The plurality of methods may be associated with the subset of functionalities. The one or more groups of methods may be generated based on an analysis of a dependency of each functionality from the subset of functionalities, an occurrence percentage of each method, and a weightage of each method from the plurality of methods. The generation of the one or more groups of methods may be illustrated using FIG. 3B.

Figure 3A:
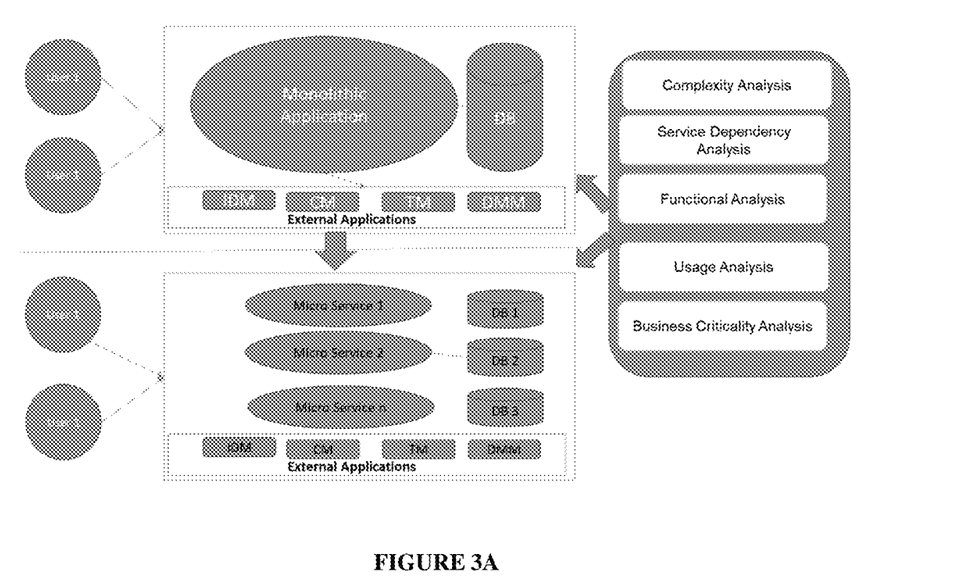
FIG. 3A illustrates types of analysis used to decompose the monolithic application into the one or more micro services, in accordance with an embodiment of the present subject matter.
Figure 3B:
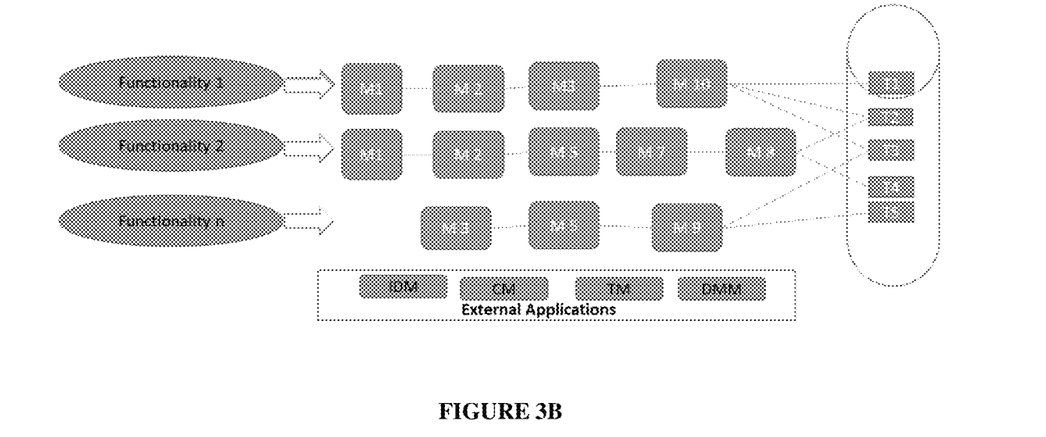
FIG. 3B illustrates generation of one or more groups of methods associated with the monolithic application, in accordance with an embodiment of the present subject matter.

Referring now to FIG. 3B, the functionalities may be analysed to identify an optimal approach for constructing the one or more micro services by the dependency and functionality analysis. The approach may identify the method affinity of the functionality and form the one or more micro services with most cohesive and relevance methods. In case other functionality or micro-services need to access the methods of another micro services it will make available through API service.

In one embodiment, the generation module 316 may identify a methods call flow of each functionality, methods responsible for a functionality flow traverse, and data tables. The methods call flow of each functionality, the methods responsible for a functionality flow traverse, and the data tables may be used to determine a dependency. In one aspect, one functionality may pass through multiple methods and operates on multiple data tables. Further, one method may be in the s call flows of multiple functions, same way data tables.

In one example, as shown in FIG. 3B, construe the functionalities as a functionally 1, a functionality 2, and a functionality 3. The methods used by the functionality 1 may be M1, M2, M3 . . . M10. Using these methods, the functionality 1 may operate the data table T1, T2 and T3. Further, the methods used by the functionality 2 may be M1, M2, M5, M7, and M8. Using these methods, the functionality 2 may operate the data table T2 and T4. Furthermore, the methods used by the functionality 3 may be M3, M5, and M9. Using these methods, the functionality 3 may operate the data table T3 and T5.

Further, the generation module may compute the occurrence percentage of each method. If the method is called by many functionalities, then the occurrence percentage may be higher. The occurrence percentage may be further compared with a threshold occurrence percentage. In one aspect, if the occurrence percentage of a method is greater than the threshold occurrence percentage. It may indicate that the method may be eligible to form the micro service. In another aspect, if the occurrence percentage of a method is less than the threshold occurrence percentage. It may indicate that the method may not be eligible to form the micro service.

In one embodiment, Table 3 may show the computation of the occurrence percentage of methods used by the functionalities. In one example, the functionalities, having the high functionality priority, may comprise F1, F2, F3 . . . F10. Further, the methods used by the functionalities may be M1, M2, M3, M4, . . . M10. In the table 3, 1 may indicate that the method may be called by the functionality once, 2 may indicate that the method may be called by the functionality twice, and likewise. Further, 0 may indicate that the method may not be called by the functionality. In this case, the generation module 216 may obtain an occurrence of each method as called by the functionality. Based on the occurrence of each method, the occurrence percentage may be computed.

TABLE 3

Computation of occurrence percentage

| Methods | Functionality | | | | | | | | | | MOP |
|---|---|---|---|---|---|---|---|---|---|---|---|
| | F1 | F2 | F3 | F4 | F5 | F6 | F7 | F8 | F9 | F10 | |
| M1 | 1 | 2 | 1 | 1 | 1 | 3 | 2 | 1 | 0 | 0 | 80% |
| M2 | 2 | 1 | 2 | 0 | 0 | 1 | 0 | 0 | 0 | 0 | 30% |
| M3 | 1 | 1 | 1 | 0 | 0 | 0 | 0 | 0 | 0 | 0 | 30% |
| M4 | 1 | 1 | 2 | 2 | 0 | 0 | 0 | 0 | 0 | 0 | 40% |
| M5 | 1 | 1 | 1 | 1 | 0 | 0 | 0 | 0 | 1 | 0 | 50% |
| M6 | 3 | 1 | 1 | 0 | 1 | 0 | 0 | 1 | 1 | 1 | 70% |
| M7 | 1 | 1 | 1 | 1 | 1 | 2 | 0 | 0 | 0 | 1 | 70% |
| M8 | 1 | 0 | 0 | 3 | 1 | 1 | 1 | 1 | 0 | 0 | 60% |
| M9 | 1 | 0 | 0 | 0 | 0 | 0 | 0 | 0 | 1 | 0 | 20% |
| M10 | 2 | 0 | 0 | 0 | 0 | 0 | 0 | 0 | 0 | 1 | 20% |

In the example above, construe 70% as the threshold occurrence percentage. In the example, the methods M1, M6, and M7 may be probable candidates to form the micro services. In one aspect, the combined complexity score of these methods may be evaluated in order to determine the number of micro services based on the complexity analysis as done by the determination module 214.

Upon determining the occurrence percentage, the generation module 216 may determine the weightage of each method. The weightage may indicate a significance of the method for the particular functionality. The weightage of method (M) with respect to a functionality (F) may correspond to the percentage of occurrence of method (M) in the functionality (F) compared with all other methods those are consumed by the functionality F. In one embodiment, Table 4 may show the weightage of the method. In one example, the weightage of Method M1 with respect to function F7 is, given in the below table 4, as 50% because F7 consumes only 3 methods (M1, M2 & M8) and out of that M1 is consumed twice by F7. Further, likewise the weightage for all the methods may be computed.

TABLE 4

Weightage of methods

| Methods | Functionality | | | | | | | | | |
|---|---|---|---|---|---|---|---|---|---|---|
| | F1 | F2 | F3 | F4 | F5 | F6 | F7 | F8 | F9 | F10 |
| M1 | 7.1 | 25.0 | 11.1 | 11.1 | 33.3 | 42.9 | 50.0 | 50.0 | 0.0 | 0.0 |
| M2 | 14.3 | 12.5 | 22.2 | 0.0 | 0.0 | 0.0 | 25.0 | 0.0 | 0.0 | 0.0 |
| M3 | 7.1 | 12.5 | 11.1 | 0.0 | 0.0 | 0.0 | 0.0 | 0.0 | 0.0 | 0.0 |
| M4 | 7.1 | 12.5 | 22.2 | 22.2 | 0.0 | 0.0 | 0.0 | 0.0 | 0.0 | 0.0 |
| M5 | 7.1 | 12.5 | 11.1 | 11.1 | 0.0 | 0.0 | 0.0 | 0.0 | 33.3 | 0.0 |
| M6 | 21.4 | 12.5 | 11.1 | 11.1 | 0.0 | 14.3 | 0.0 | 0.0 | 33.3 | 33.3 |
| M7 | 7.1 | 12.5 | 11.1 | 11.1 | 33.3 | 28.6 | 0.0 | 0.0 | 0.0 | 33.3 |
| M8 | 7.1 | 0.0 | 0.0 | 33.3 | 33.3 | 14.3 | 25.0 | 50.0 | 0.0 | 0.0 |
| M9 | 7.1 | 0.0 | 0.0 | 0.0 | 0.0 | 0.0 | 0.0 | 0.0 | 33.3 | 0.0 |
| M10 | 14.3 | 0.0 | 0.0 | 0.0 | 0.0 | 0.0 | 0.0 | 0.0 | 0.0 | 33.3 |

In one aspect, the table 4 may be a sample method relevance matrix table with respect to the functionality. The method more relevant to the functionality may be considered as more eligible candidate to be part of the micro-service formed out of that functionality. Further, based on the complexity analysis, if a functionality is above the acceptable complexity score and some methods need to be removed to bring the complexity score under control. The methods with less relevance score may be probable candidate to move out. Furthermore, if method relevance value is same for a method with respect to more than one functionality, business criticality analysis and complexity analysis result may be considered for most suitable functionality to own that method. Other functionality can consume that method through APIs.

Once the dependency, the occurrence percentage and the weightage are computed, the generation module 216 may generate the one or more groups of the methods from the plurality of methods. The one or more groups may be generated based on an analysis of the dependency, the occurrence percentage and the weightage.

Upon generation the one or more groups, the decomposition module 218 may decompose the monolithic application into the one or more micro services. In one aspect, the methods in the group identified may be configured to form the methods of the decomposed micro-services. The dependency analysis performed may be used to identify the dependency between micro-services.

The monolithic application may be converted based on the one or more groups and the number of micro services. Some of the micro services may have the method used in common. In one aspect, one micro service may access a method of another micro services through an API service. The decomposition of the monolithic application into the one or more micro services may be disclosed in the FIG. 3A.

Referring to FIG. 3A, the monolithic application is converted into the one or more micro services such as M1, M2, . . . Mn. The conversion may be performed based on various dimensions including Complexity analysis, Dependency analysis, Functional analysis, usage analysis and business analysis to identify probable micro services.

Exemplary embodiments discussed above may provide certain advantages. Though not required to practice aspects of the disclosure, these advantages may include those provided by the following features.

Some embodiments of the system and the method is configured to decompose a monolithic application into one or more micro services.

Some embodiments of the system and the method enables the decomposition into the one or more micro services based on the prioritized functionalities.

Figure 4:
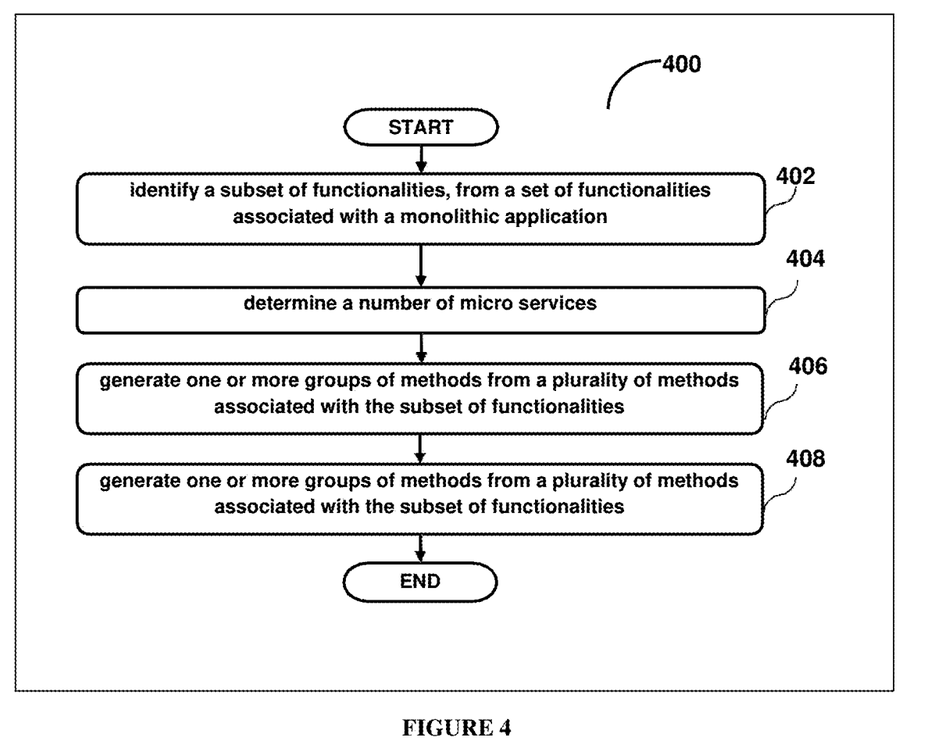
FIG. 4 illustrates a method for decomposing a monolithic application into one or more micro services, in accordance with an embodiment of the present subject matter.

Referring now to FIG. 4, a method for decomposing a monolithic application into one or more micro services, is disclosed in accordance with an embodiment of the present subject matter. The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a subset of functionalities, from a set of functionalities may be identified. In one implementation, the identification module 212 may identify the subset of functionalities. The set of functionalities may be associated with the monolithic application. The subset of functionalities may be identified based on a cost benefit analysis of each functionality from the set of functionalities.

At block 404, a number of micro services may be determined. In one implementation, the determination module 214 may be configured to determine the number of micro services. The number of micro services may be determined based on a functionality priority, a functionality complexity score, and a functionality predefined complexity score associated with each functionality from the subset of functionalities.

At block 406, one or more groups of methods, from a plurality of methods associated with the subset of functionalities, may be generated. In one implementation, the generation module 216 may generate the one or more groups of methods. The one or more groups of methods may be generated based on an analysis of a dependency of each functionality from the subset of functionalities, an occurrence percentage of each method, and a weightage of each method from the plurality of methods.

At block 408, the monolithic application may be decomposed into the one or more micro services. In one implementation, the decomposition module 218 may decompose the monolithic application into the one or more micro services. The monolithic application may be converted into the one or more micro services based on one or more groups of methods, and the number of micro services.

Although implementations for systems and methods for decomposing a monolithic application into one or more micro services have been described, it is to be understood that the appended claims are not necessarily limited to the specific features or methods described. Rather, the specific features and methods are disclosed as examples of implementations for decomposing the monolithic application into the one or more micro services.

The invention claimed is:

1. A method for decomposing a monolithic application into one or more micro services, the method comprising:
   identifying, by a processor, a subset of functionalities, from a set of functionalities associated with a monolithic application, wherein the subset of functionalities is identified based on a cost benefit analysis of each functionality from the set of functionalities;
   determining, by the processor, a number of micro services based on a functionality priority, a functionality complexity score, and a functionality predefined complexity score associated with each functionality from the subset of functionalities, wherein the functionality complexity score, associated with each functionality, is determined based on one or more parameters, and wherein the functionality complexity score is a computation using a weightage of each parameter, and a complexity value of each parameter;
   generating, by the processor, one or more groups of methods from a plurality of methods associated with the subset of functionalities, wherein the one or more groups of methods are generated based on an analysis of a dependency of each functionality from the subset of functionalities, an occurrence percentage of each method, and a weightage of each method from the plurality of methods;
   decomposing, by the processor, the monolithic application into the one or more micro services based on the one or more groups of methods, and the number of micro services; and
   enabling, by the processor, one micro service to access a method of another micro services through an API service.

2. The method as claimed in claim 1, wherein the cost benefit analysis comprises analysis using one of a functionality usage count, a functionality business criticality, and a functionality expected life.

3. The method as claimed in claim 1, wherein the dependency is determined based on a method call for each method, from the plurality of methods, methods responsible for a functionality flow traverse, and data tables.

4. A system for decomposing a monolithic application into one or more micro services, the system comprising:
   a memory;
   a processor coupled to the memory, wherein the processor is configured to execute instructions stored in the memory to:
      identify a subset of functionalities, from a set of functionalities associated with monolithic application, wherein the subset of functionalities is identified based on a cost benefit analysis of each functionality from the set of functionalities;
      determine a number of micro services based on a functionality priority, a functionality complexity score, and a functionality predefined complexity score associated with each functionality from the subset of functionalities, wherein the functionality complexity score, associated with each functionality, is determined based on one or more parameters, and wherein the functionality complexity score is a computation using a weightage of each parameter, and a complexity value of each parameter;
      generate one or more groups of methods from a plurality of methods associated with the subset of functionalities, wherein the one or more groups of methods are generated based on an analysis of a dependency of each functionality from the subset of functionalities, an occurrence percentage of each method, and a weightage of each method from the plurality of methods;
      decompose the monolithic application into the one or more micro services based on the one or more groups of methods, and the number of micro services; and
      enable one micro service to access a method of another micro services through an API service.

5. The system as claimed in claim 4, wherein the cost benefit analysis comprises analysis using one of a functionality usage count, a functionality business criticality, and a functionality expected life.

6. The system as claimed in claim 4, wherein the dependency is determined based on a method call for each method, from the plurality of methods, methods responsible for a functionality flow traverse, and data tables.

7. The method as claimed in claim 2, wherein the cost benefit analysis comprises computing a cost benefit score based on a weighted combination of the functionality usage count, the functionality business criticality and the functionality expected life compared against the cost of effort required for decomposition of the functionality.

8. The method as claimed in claim 7, wherein the functionality priority for a functionality is determined based on the cost benefit score of the functionality and a predefined threshold score.

9. The method as claimed in claim 1, wherein the one or more parameters comprises at least one of a response time analysis, a CPU utilization analysis, a code sizing analysis, a cyclomatic complexity analysis, a cognitive complexity analysis, an external dependency analysis, or a DB dependency analysis.

10. The system as claimed in claim 5, wherein the cost benefit analysis comprises computing a cost benefit score based on a weighted combination of the functionality usage count, the functionality business criticality and the functionality expected life compared against the cost of effort required for decomposition of the functionality.

11. The system as claimed in claim 10, wherein the functionality priority for a functionality is determined based on the cost benefit score of the functionality and a predefined threshold score.

12. The system as claimed in claim 4, wherein the one or more parameters comprises at least one of a response time analysis, a CPU utilization analysis, a code sizing analysis, a cyclomatic complexity analysis, a cognitive complexity analysis, an external dependency analysis, or a DB dependency analysis.

* * * * *